Nov. 17, 1953

I. M. ARCHER 2,659,475

PAN TURNING MECHANISM

Filed Feb. 3, 1950

Inventor
Irving M. Archer
By Fishburn & Mullendore
Attorneys

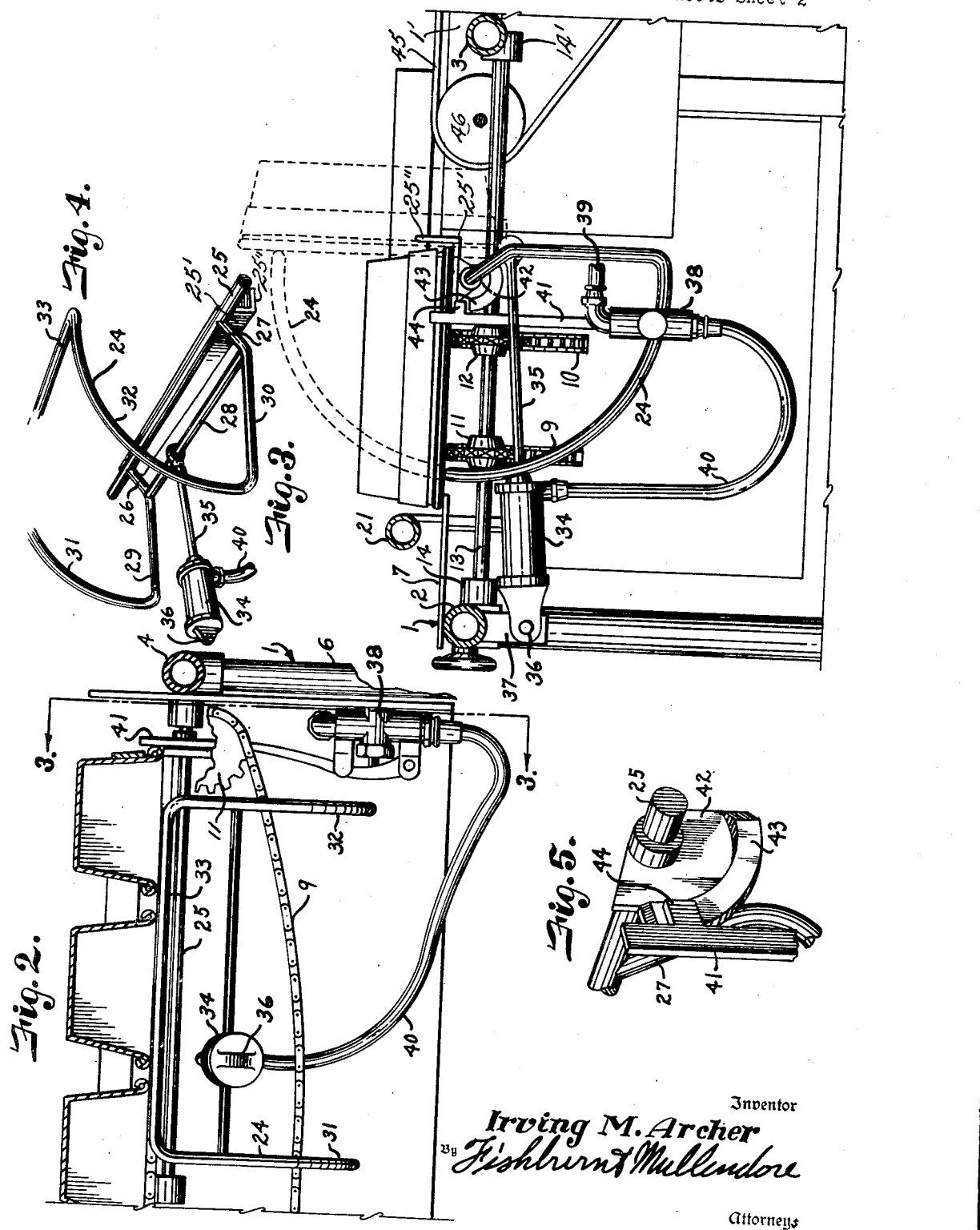

Patented Nov. 17, 1953

2,659,475

UNITED STATES PATENT OFFICE 2,659,475

PAN TURNING MECHANISM

Irving M. Archer, Dallas, Tex., assignor to Campbell Taggart Research Corporation, Dallas, Tex., a corporation of Missouri Application February 3, 1950, Serial No. 142,234

4 Claims. (Cl. 198—33)

This invention relates to a pan turning and direction changing apparatus, the present application being a continuation in part of my copending application Serial No. 602,822 filed July 2, 1945, now Patent No. 2,499,621, issued March 7, 1950, and entitled "Machine for Applying a Coating to the Interior of Pans."

Strapped pans such as used by bakeries are transported from one machine to another by means of conveyors, and it is often necessary to turn the pans from the position they assume when discharged from one machine so that they will be in proper position to be received by a succeeding machine. For example, in the above mentioned application which involves a pan greasing machine, the pans are discharged onto a receiving conveyor in upside-down position to be coated, and it is necessary to turn the pans to an upright position prior to their delivery to a conveyor leading to a pan filling machine.

The principal object of the present invention is to provide an apparatus for turning the pans in rapid succession without battering or otherwise damaging the pans.

Other objects are to provide a positive turning mechanism operable under control of the pans as they reach turning position; to provide a turning apparatus which changes the direction of travel of the pans; and to provide a simple pan turning mechanism having relatively few parts.

In accomplishing these and other objects of the invention hereinafter pointed out, I have provided improved structure the preferred form of which is illustrated in the accompanying drawings wherein:

Fig. 2 is a fragmentary sectional view on the line 2—2 of Fig. 1 and illustrating a set of strapped pans in upside-down position over the turning mechanism and ready to be moved to an upright position on the offtake conveyor.

Fig. 3 is a cross section on the line 3—3 of Fig. 2 showing movement of a set of strapped pans in dotted lines.

Fig. 4 is a perspective view of the pan turning device.

Fig. 5 is a fragmentary perspective view of a part of the pan turning mechanism particularly illustrating the detent for continuing application of the power necessary to complete turning of the pans.

Figure 1:
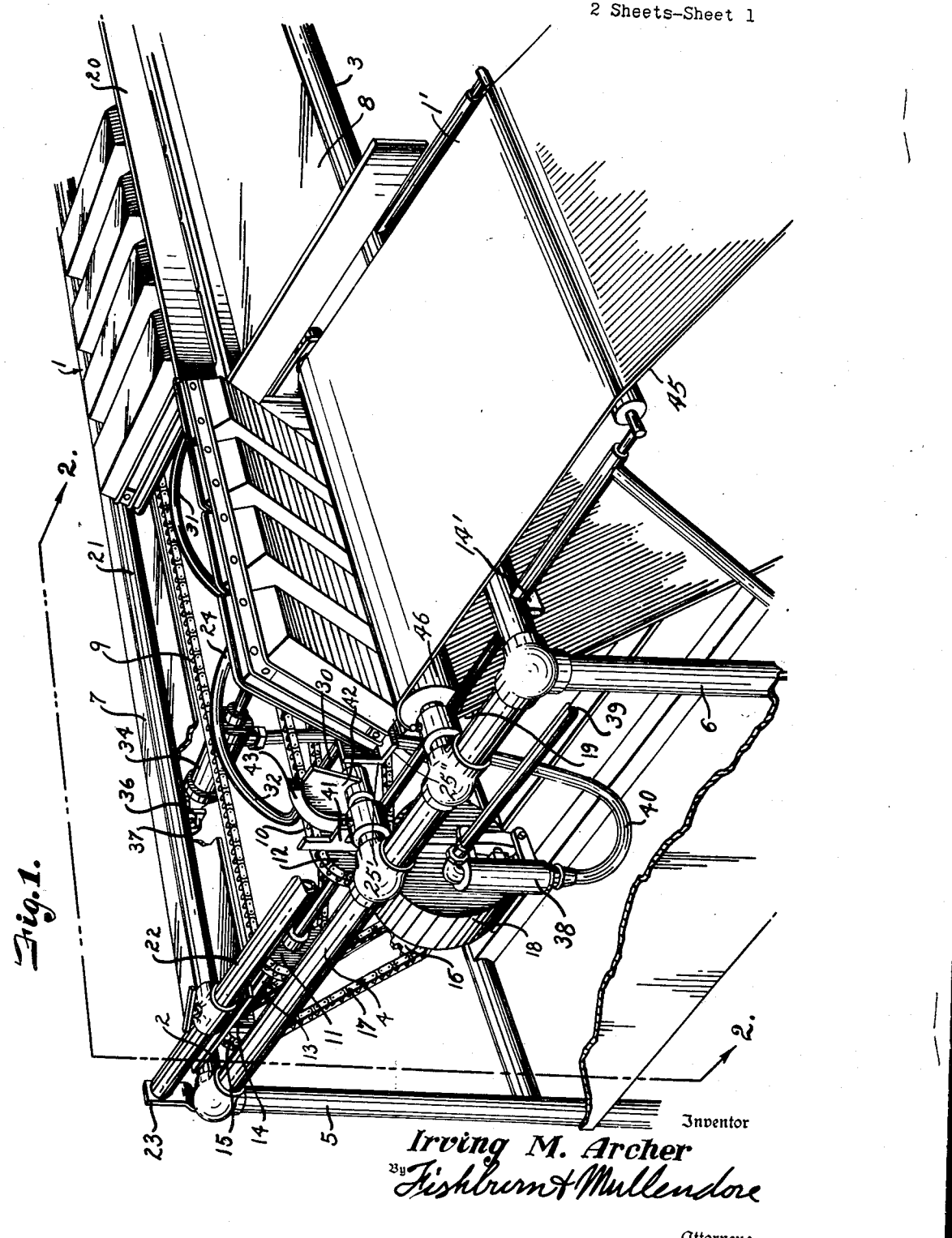
Fig. 1 is a perspective view of a pan turning mechanism constructed in accordance with the present invention and showing a set of strapped pans being moved onto the offtake conveyor.

Referring more in detail to the drawings:

1 designates a conveyor by which sets of strapped pans are delivered one after the other, for example, in inverted position from a pan greasing machine to a pan turning mechanism incorporating the features of the present invention.

The conveyor 1 includes a frame having spaced side rails 2 and 3 connected by crossrails 4 and supported on legs 5 and 6. Extending along the frame members 2 and 3 are table top sections 7 and 8 having inner edges spaced apart to accommodate therebetween a pair of spaced endless chains 9 and 10 operating over sprockets 11 and 12 that are fixed to a shaft 13 which extends transversely of the frame and mounted in bearing brackets 14 and 14' as best shown in Fig. 3. The shaft 13 carries a driving sprocket 15 that is driven from a sprocket 16 by a chain 17 operating thereover as best shown in Fig. 1. The sprocket 16 is mounted on the power output shaft of a speed reducing mechanism indicated by the housing 18 and which in turn is operated by a motor 19 having a driving connection therewith.

As above mentioned, sets of strapped pans are carried along the table top sections by the conveyor chains, the weight of the pans on the conveyor chains being sufficient to provide the desired driving connection.

The pans are guided along the conveyor between a fixed guide rail 20 and an adjustable guide rail 21 that is adjustably mounted on crossrails 22 carried by brackets 23 at the ends of the frame, as best shown in Fig. 1. The spacing between the guide rails 20 and 21 is therefore adjustable so as to adapt the conveyor to different sized pans. As the pans approach the end of the conveyor, they enter over the pan turning mechanism which constitutes the features of the present invention. The pan turning mechanism includes a lifting device 24 having a shaft 25 journaled at the end of the longitudinal guide rail 20 at the delivery end of the conveyor. Extending from the shaft 25 are spaced arms 26 and 27 connected by a crossbar 28. The arms 26 and 27 have continuations 29 and 30 extending at obtuse angles and connected with arcuate portions 31 and 32 that are connected by a crossbar 33. The shaft 25 also carries an angle bar 25' having a flange 25'' which forms a support for the pans when the lifting device is in operation and to provide a fulcrum on which the pans overturn onto a laterally extending offtake conveyor 1' which leads to a pan filling machine (not shown).

The turning device is adapted to be oscillated by an air cylinder 34 through a connecting rod 35 having pivotal connection with the crossbar 28. The air cylinder 34 is pivotally journaled as at 36 on a bracket 37 depending from the longitudinal rail 2 (see Fig. 3). When the lifting device is at rest, the bar 33 is positioned under the path of the pans moving into position to be turned as shown in full lines—Fig. 3.

In order to effect actuation of the air cylinder 34 when a pan or set of pans is in position to be turned, the machine is provided with an air control valve 38 which is supplied with air under pressure through a supply connection 39, and which is discharged when the valve is open through a pipe 40 leading to the air cylinder 34. The valve is actuated by a lever arm 41 that is pivotally connected with the valve housing, and which extends upwardly into the path of the pans being carried by the conveyor chains 9 and 10 so that when the endmost pan of a set engages the lever, the lever is moved to open the valve 38 (see Fig. 2).

In order to retain the lever in valve open position until the turning device has made sufficient stroke to effect turning of a strapped set of pans, the rock shaft of the turning device carries an arcuate cam segment 42 having a track 43 that moves into position to engage a lug 44 on the lever arm 41 to hold the lever arm in valve opening position until the set of pans have been tipped to the dotted line position shown in Fig. 3 from where they topple onto the offtake conveyor in upright position. At this time the cam track 43 has passed the lug on the lever arm and the lever arm swings forwardly to allow closing of the valve and venting of the actuating cylinder. The turning device is then free to rock retractively and return to its original or at rest position. It is thus obvious that as long as the valve operating lever is retained in retracted position by the cam, the air cylinder is effective in making a full stroke of the position of the piston.

The offtake conveyor 1' includes a belt 45 operating over a roller 46 that is spaced from a side of the conveyor 1 to allow the angle bar 25' to move downwardly therebetween when the pans are overturned on the conveyor belt with the bottom of the pans engaging the belt at the point of the roller. The angle bar thus supports the pans while they are in an edgewise position, as shown in dotted lines, Fig. 3, and forms a fulcrum support on which the pans topple onto the belt of the offtake conveyor.

When a set of pans is being turned, the succeeding pans are held back by the arcuate arm 31 of the turning device and another set of pans cannot move into position until the turning device has returned to its at rest position.

From the foregoing it is obvious that I have provided a pan turning device that is of simple and positive operation and which is also adapted to change direction of movement of the pans simultaneously with turning over thereof.

What I claim and desire to secure by Letters Patent is:

1. In an apparatus of the character described, a conveyor for moving pans along a fixed path, pan overturning means including a rock shaft at the discharge end of the conveyor, spaced arcuate arms extending from the rock shaft, a pan engaging member connecting the free ends of said arms, a bar connecting said arms adjacent said rock shaft, a pressure fluid cylinder, a piston slidable in the cylinder, a piston rod connecting the piston with said connecting bar to effect rocking movement of the shaft, an arcuate cam track on said rock shaft, a valve for controlling flow of pressure fluid to the pressure cylinder, an operating lever for the valve and having a portion projecting into the path of the pans, to be engaged by the pans for effecting operation of the piston, means on the arm for engaging the cam to hold the valve open for the full stroke of said piston, said cam track being of a length to pass off of said cam engaging means at the completion of the stroke for releasing said lever from holding the valve in said open position for return of the pan overturning means, and fulcrum means extending along the rock shaft for engaging the side of the pan opposite to the side engaged by the pan engaging member.

2. In an apparatus of the character described for turning pans from an inverted position to an upright position, means for moving pans along a fixed path in inverted position, pan turning means, a pressure fluid cylinder, a piston slidable in the cylinder, a piston rod connecting the piston with said pan turning means, a valve controlling flow of pressure fluid to the pressure cylinder, an operating lever for the valve projecting into the path of the pans, to be engaged by the pans for effecting operation of the piston, means on the arm for engaging the cam to hold the valve open for the full stroke of said piston, said cam having a track portion of a length to pass off of said cam engaging means at the completion of the stroke for releasing said lever from holding the valve in said open position for return of the pan overturning means, and fulcrum means forming a support for one end of the pan while the pan turning means is carrying the other end of the pan over a substantially perpendicular position.

3. In an apparatus of the character described for turning pans from an inverted position to an upright position, means for moving pans along a fixed path in inverted position, pan turning means, a pressure fluid cylinder, a piston slidable in the cylinder, a piston rod connecting the piston with said pan turning means, a valve controlling flow of pressure fluid to the pressure cylinder, an operating lever for the valve projecting into the path of the pans, to be engaged by the pans for effecting operation of the piston, means on the arm for engaging the cam to hold the valve open for the full stroke of said piston, said cam having a track portion of a length to pass off of said cam engaging means at the completion of the stroke for releasing said lever from holding the valve in said open position for return of the pan overturning means, pan fulcruming means forming a support for one end of the pan while the pan turning means is carrying the other end of the pan over a substantially perpendicular position and effect complete overturning of the pans, and an offtake conveyor for receiving the pans completely overturned.

4. An apparatus for turning pans from an inverted position to an upright position including, a longitudinal conveyor for moving pans along a fixed path in inverted position, an offtake conveyor extending laterally of the longitudinal conveyor for carrying the pans in upright position, a pan overturning means between said conveyors including pan lifting means movable through the longitudinal conveyor and adapted to move about an axis of oscillation extending in a lengthwise direction with respect to the longitudinal conveyor, said lateral conveyor having an end spaced from the longitudinal conveyor, a pan support carried with the pan lifting means in spaced relation with said axis of oscillation to swing downwardly within the space between said conveyors and below the offtake conveyor, said pan support being adapted to be engaged by ends of the pans as the pan lifting means moves about said axis of oscillation, and means for effecting oscillation of the pan lifting means on said axis to carry the pans into a substantially endwise position and with the ends of the pans resting on said support and below the offtake conveyor with the bottoms of the pans making contact with the end of the offtake conveyor and over which the pans topple from said pan lifting means onto the offtake conveyor to control the force with which the pans drop onto the offtake conveyor.

IRVING M. ARCHER.

References Cited in the file of this patent

UNITED STATES PATENTS

| Number | Name | Date |
| --- | --- | --- |
| 1,295,195 | Parker | Feb. 25, 1919 |
| 1,870,224 | Berry | Aug. 9, 1932 |
| 2,264,826 | Butterfield | Dec. 2, 1941 |
| 2,344,664 | Adams | Mar. 21, 1944 |
| 2,593,119 | Davis | Apr. 15, 1952 |